Jan. 4, 1938.  C. W. PIERSON  2,104,209
AIR CONDITIONER
Filed July 23, 1934   3 Sheets-Sheet 1

Inventor:
Carl W. Pierson

Jan. 4, 1938.   C. W. PIERSON   2,104,209
AIR CONDITIONER
Filed July 23, 1934   3 Sheets-Sheet 2

Inventor
Carl W. Pierson
By Wilson, Dowell, McCanna
& Wintercorn
Attys.

Jan. 4, 1938. C. W. PIERSON 2,104,209
AIR CONDITIONER
Filed July 23, 1934 3 Sheets-Sheet 3
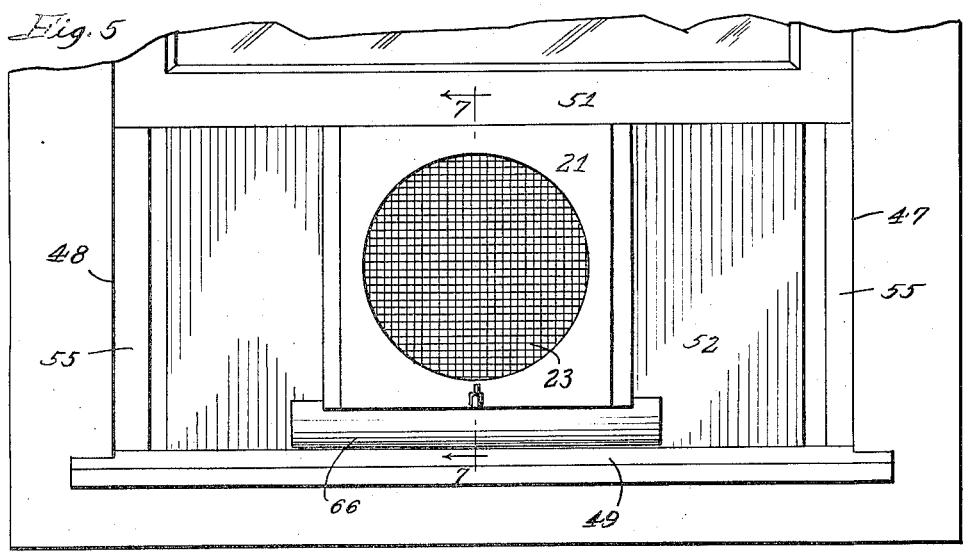
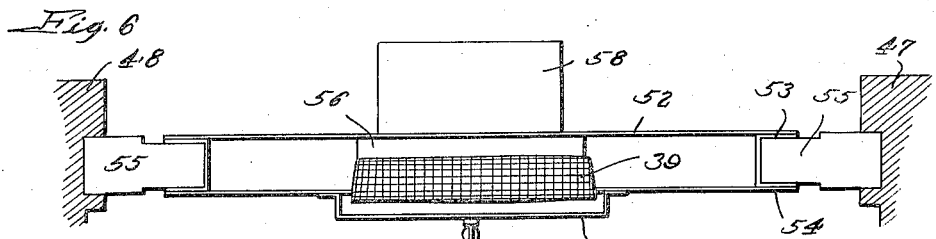
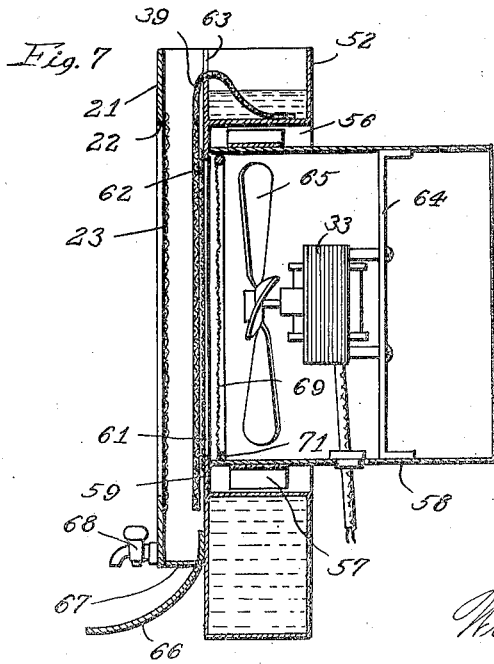
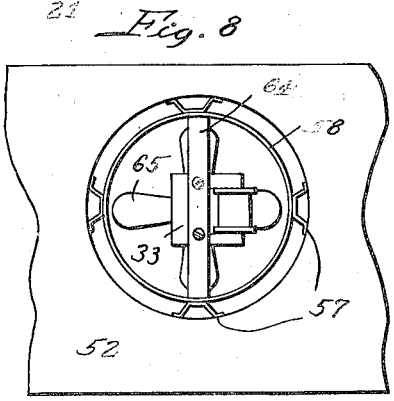
Inventor:
Carl W. Pierson
By
Wilson, Bowell, McCanna & Wintersen
Attys.

Patented Jan. 4, 1938

2,104,209

UNITED STATES PATENT OFFICE 2,104,209

AIR CONDITIONER

Carl W. Pierson, Rockford, Ill.

Application July 23, 1934, Serial No. 736,474

5 Claims. (Cl. 261—107)

This invention relates to air conditioning apparatus by special reference to a portable unitary mechanism for washing and humidifying the air during periods of low humidity, and cooling and dehumidifying the air during periods of high humidity.

An object of this invention is to provide air conditioning apparatus adapted selectively for either humidifying or dehumidifying.

Another object of the invention is to provide a generally improved and simplified humidifying air and filtering apparatus.

A further object of the invention is to provide humidifying apparatus having a self-cleaning filter screen and substantially uniform automatic flow regulation.

I have also aimed to provide a humidifying and filtering apparatus having spaced tanks and a screen for conducting fluid between the tanks, and means for regulating the flow of fluid through the screen by means of capillarity.

Another object of the invention is to provide means for precipitating and collecting moisture from the air to dehumidify the same.

I have further aimed to provide improved means for filtering air entering a room to remove pollen and other foreign material causing or contributing to allergic disturbances.

Other objects and advantages will be apparent from the following description and the accompanying drawings, in which—

Fig. 5 is a face view of the structure embodying my invention adapted for use in filtering air through a window opening;

Fig. 6 is a top view of the form shown in Fig. 5 showing the window frame in section;

Fig. 7 is a section on the line 7—7, and

Fig. 8 is a fragmentary back view.

Figure 1:
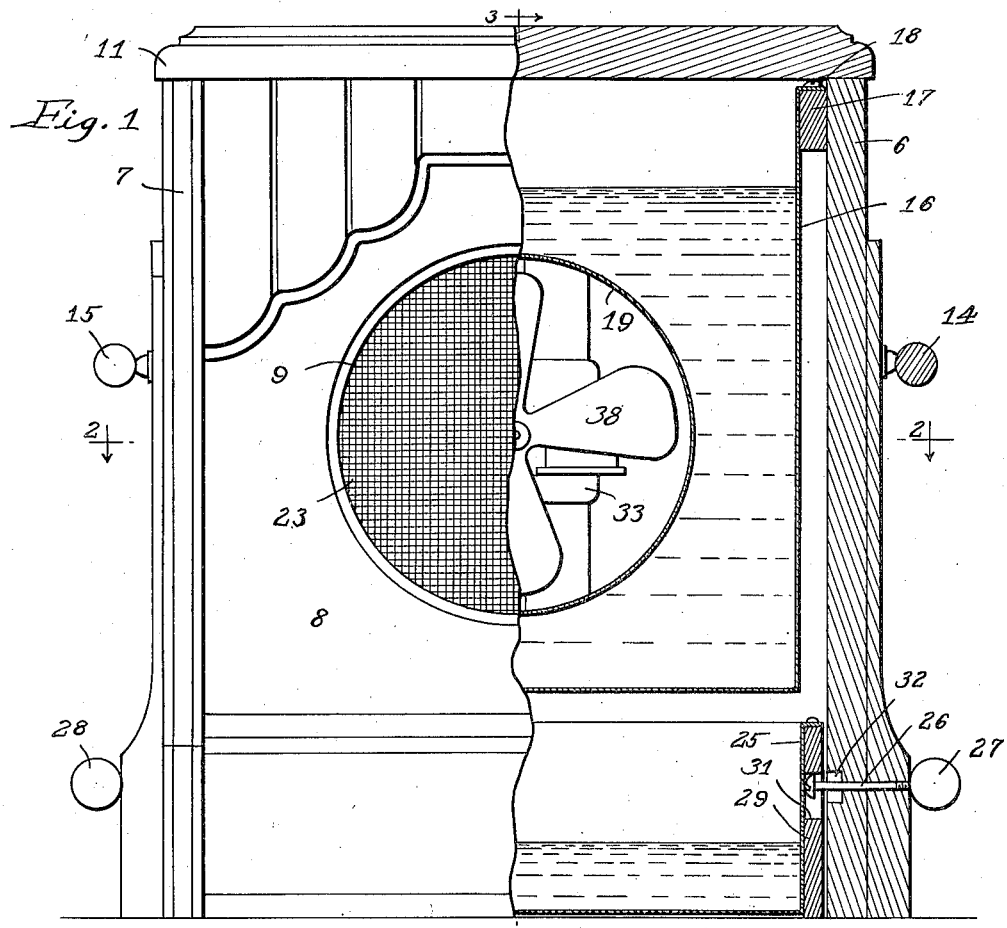
Figure 1 is a front view of an air conditioning apparatus embodying my invention.

While the invention may take many different forms, I have herein shown it in such form as embodied in a portable device including a cabinet having side walls designated generally by the numerals 6 and 7, a front designated by the numeral 8 having a central opening 9, a top 11 and a back 12, the top being hinged to the back by means of hinges 13. The sides 6 and 7 are provided with handles 14 and 15 for the purpose of carrying the device or moving the same about.

A rectangular tank designated generally by the numeral 16 is supported in the top of the cabinet on blocks 17 by means of screws 18. The tank has a central cylindrical air channel 19 extending therethrough from front to back and on the front carries a vertically disposed channel 21 having an opening 22 in registration with the air channel 19. The opening 22 has a screen 23 positioned thereover for the purpose of covering the opening 9 in the cabinet and permitting air to be moved through the channel 19, the opening 22 and the opening 9, the air being drawn in from the rear of the cabinet through an opening 24.

A drainage tank designated generally by the numeral 25 is supported at the bottom of the cabinet on pins 26 which extend through the side walls and carry knobs 27 and 28 on the outer ends thereof. The tank 25 has a block 29 on each end thereof, each block having an opening 31 for the reception of the heads of the pins 26 whereby to removably secure the tank within the cabinet. It will be observed that the tank may be removed from the cabinet by withdrawing the bolts 26 into openings 32 on the inner face of the cabinet, whereupon the cabinet may be lifted off the tank.

Figure 2:
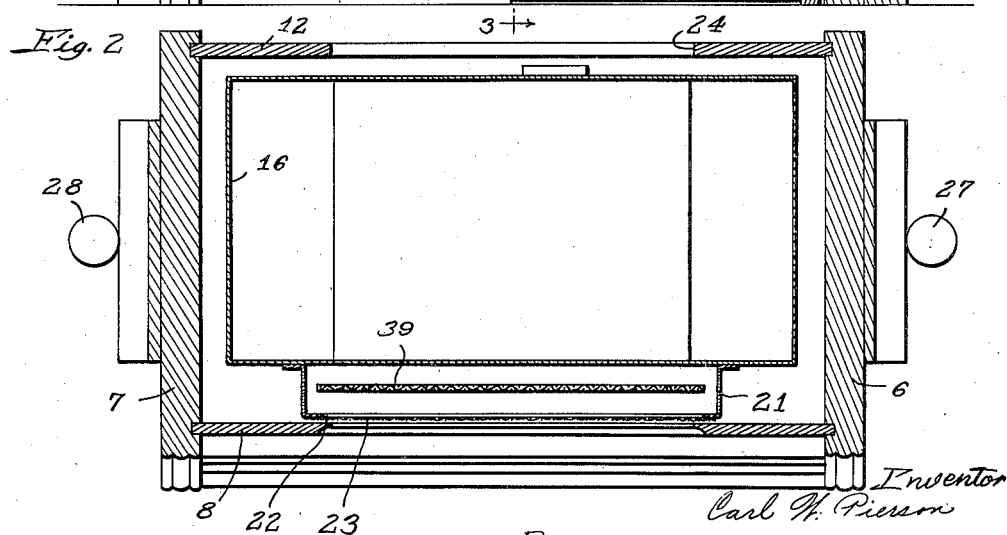
Fig. 2 is a section on the line 2—2 of Figure 1.

A motor, designated generally by the numeral 33, is secured within the air channel 19 by means of bolts 34 supporting the motor on a bracket 35 which is fastened to the tank 16 and extends across the back of the channel 19. A switch 36 serves to control the supply of current to the motor through the lids 37. The motor carries fan blades 38 positioned within the air channel 19 for propelling air through the air channel 19. A filter screen 39 is formed of wick-like absorbent material such as cotton and is loose within the cabinet, one end thereof being disposed in the fluid in the upper tank 16 as shown at 41, the screen being trained over the front edge of the tank 16, the tank being cut away as shown at 42 to receive the screen. The screen then extends down through the channel 21 as shown in Fig. 2, across the opening 22 therein to a point above the tank 25. Advantageously the lower end of the screen will be disposed within the tank but at a point out of contact with the liquid therein.

In operation, the tank 16 is substantially filled with water and the fan is turned on by actuation of the switch 36. Through capillarity the water creeps along the screen and up over the front edge of the tank completely saturating the screen. At the same time air is driven through the air channel 19 and through the screen 39, the air driving the screen 39 against the screen 23 covering the opening 22. The dry air thus propelled through the wet screen takes up moisture in its passage, thus increasing the relative humidity of the room in which the device operates. Furthermore, the air as it passes through the screen 39 deposits solid matter such as dirt, smoke and the like upon the wet screen. The wick composing the screen 39 is so constructed that a greater amount of water is carried from the tank 16 by capillarity than can be vaporized by the air passing through the air channel 19. Consequently, there is always an excess of water flowing slowly through the screen, which carries the dust particles and other filtered material down through the screen, thus continuously flushing the screen. The excess water drops from the lower end of the screen into the drain tank 25 from which it is dumped at intervals. Thus it will be seen that the device serves to clean the air and also to humidify the same. I desire to draw particular attention to the structure which accomplishes this continuous humidifying and cleaning operation. It will be seen that no valves of any kind are employed in the device, and that the flow of water in the screen 39 is regulated automatically through capillarity, which serves in a sense to syphon water from the tank 16 over the front edge thereof and down through the screen. This regulation of flow is accomplished through capillarity, and it will be observed that the greater the amount of water evaporated from the screen by the passage of air therethrough, the greater will be the flow of water through the screen so that the flushing or washing action on the screen is substantially uniform at all times.

The device may be equally well used for the purpose of dehumidifying the air. In this operation the upper tank 16 is filled with ice and the screen 39 is brought to a position in which no part of its rests within the tank 16 so that no water is brought over onto the screen by capillarity. Under these circumstances the warm air, heavily laden with moisture, is drawn into the air channel 19 by the fan. The walls of this channel are cooled by the ice which completely surrounds the same so that when the warm air strikes these cold surfaces, the moisture is precipitated therefrom. Part of this moisture precipitates on the walls of the air channel while the remainder is driven against the screen 39 in the form of small droplets. The moisture striking the screen serves to dampen the same whereby the air passing through the screen is cleaned by the filtering action of the damp screen.

Figure 3:
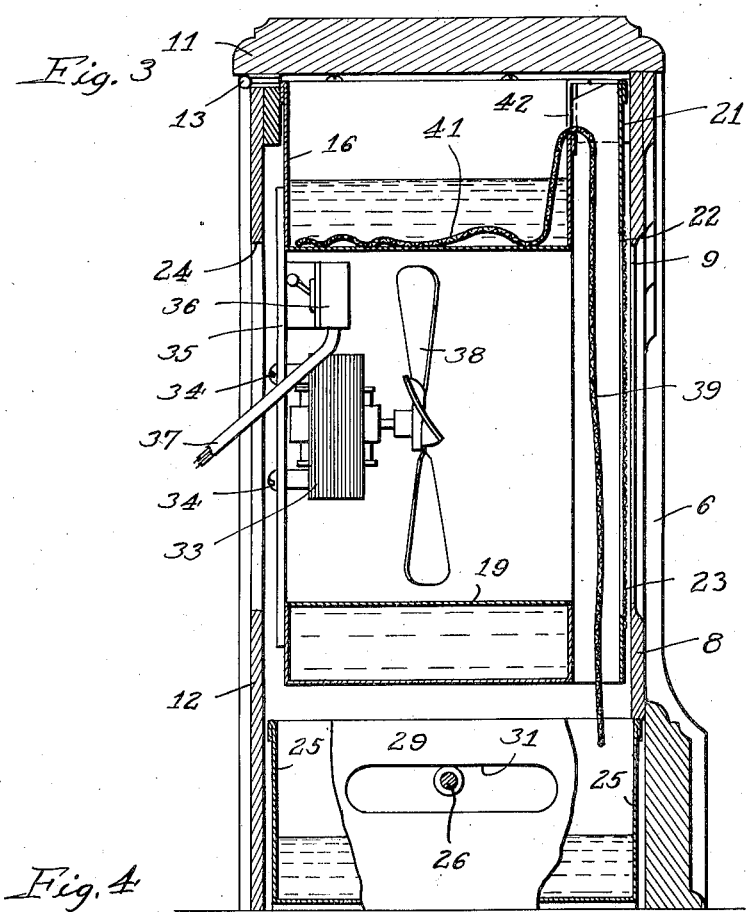
Fig. 3 is a section on the line 3—3 of Figure 1.
Figure 4:
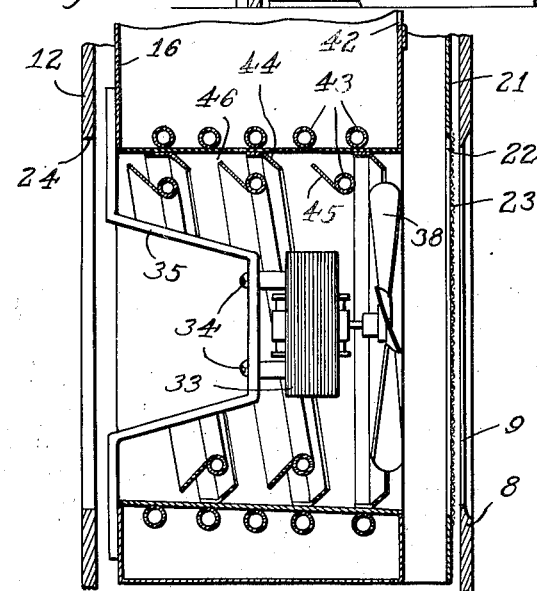
Fig. 4 is a fragmentary section similar to Fig. 3 showing a modified form of the invention.

Referring now to Fig. 4, more effective dehumidifying action may be obtained by the structure therein shown, while the humidifying action of the device will remain unchanged. In this instance, I have provided a plurality of coils 43 adapted to be connected in a well known manner to an artificial refrigeration unit, these coils serving as the evaporator of the refrigeration unit. Baffles 44 and 45 are attached to the walls of the air channel 19 and extend inwardly to increase the surface area subject to contact by the warm air. Part of the coils may be carried on the baffles, such, for instance, as the baffles 45, which baffles are spaced from the walls of the air channel, as shown at 46, to cause a portion of the air to take a circuitous route through the air channel. If desired, the air channel 19 may be flared as shown in Fig. 4 so as to cause the moisture precipitated thereon to flow through the front of the cabinet and drip into the drain tank 25. It will be seen that the modification shown in Fig. 4 may be used as explained for the modification of Figs. 1-3, water or other fluid being placed in the tank 16 to be carried over the front edge of the tank and down across the air channel as previously explained. If the operator does not desire to connect the device to a refrigeration unit, ice may be placed in the upper tank as already set forth, and the device used in the manner set forth above.

In Figs. 5-8 I have shown the device as adapted for use as an air filter adapted particularly for use by persons suffering from hay fever and similar allergic disturbances. In such use the device is adapted to closely fit between the side members 47 and 48 of the window frame and between the bottom of the frame 49 and the bottom of the window 51. A tank 52 corresponding in function to the tank 16 is relatively shallow, as shown in Fig. 8, and is provided with flanges 53 and 54 on opposite sides thereof for the reception of blocks 55 adapted to be received in the groove of the window frame to support the tank therein. The tank is provided with a central opening 56 extending through the tank and provided with spring clips 57 for the purpose of holding an air channel 58 by spring contact against the outer walls thereof. The front wall of the tank extends inwardly to provide an annular flange 59 around the opening 56 against the inner side of which the end of the air channel 58 abuts. The flange 59 describes an opening 61 which is covered by a metallic or similar screen 62 fixed in position. The front of the tank 52 carries the vertically disposed channel 21 previously described having the opening 22 for the passage of air and the metal screen 23. The lower end of the channel is closed as shown at 67, a cock 68 being positioned in the closed end to either catch the drip from the screen in the bottom of the channel or permit it to drain therethrough. Likewise, the front edge of the tank 52 is cut away as shown at 63 within the vertical channel 21. As in the form shown in Figs. 1-3, the wick-like screen 39 has one end immersed in the liquid held in the tank 52 and is trained over the front edge of the tank through the opening 63, the remainder of the wick or screen being disposed downward across the opening 61. The motor 33 is in this instance carried on the air channel 58 by means of a bracket 64, the fan blade 65 being pitched in a direction opposite that of the previously described forms so that air will be drawn through the openings 22 and 61 and be discharged through the air channel 58 to the interior of the room. A lip 66 is attached to the front side of the tank 52 adjacent the lower edge thereof so that the fluid dripping from the wick 39 will be conducted outward and allowed to drop downward free of the window frame.

It will be seen that this arrangement is such that all or substantially all of the air entering through the window is caused to pass through the wick 39 which is saturated with water or other fluid. Passage of the air through the film of liquid provided by the screen 39 causes the particles of pollen, dust and other materials to be filtered from the air prior to its entry into the room served by the window. As previously explained, the capacity of the wick 39 is such that there is a continuous passage of liquid down through the wick which continuously washes the wick, carrying off a large portion of the impurities filtered from the air. One phase of the invention contemplates the use of light petroleum oil or similar liquid in the tank 52. This provides a non-aqueous wetting medium for the filter screen which does not have the effect of increasing the humidity of the air, and for many purposes is more effective than water in wetting the impurities in the air. Under these circumstances I employ a collecting screen 69 of dry cloth carried on a wire hoop 71 slidable into the inner end of the air channel 58 as shown in Fig. 7.

Attention is directed to the fact that the screen 39 lies loosely in the device so that it is only necessary to lift it out in order to remove it for cleaning or replacement. In any structure of this nature, it is necessary to frequently replace the wick and to wash the deposits therefrom. These deposits may be roughly divided into two groups, one of them being that material deposited on the screen from the air and which is not washed off by the continuous flow of water through the screen. The filter is effective, during certain seasons, to separate large amounts of pollen from the air. The second group of impurities is that resulting from the water itself, that is, if hard water is employed in the tank, the evaporation leaves a considerable deposit of lime on the cloth wick, which causes the wick to lose its capillarity. It is, therefore, frequently necessary to remove the wick and wash both of these impurities out. My device provides for the accomplishment of this purpose with a maximum facility.

While the device is intended primarily as an air washing, air humidifying, and air dehumidifying apparatus, it may also be used for the distributing of other types of materials, such as insecticides, moth proofing compositions, and the like.

While I have thus described and illustrated a specific embodiment of my invention, I am aware that numerous alterations and changes may be made therein without departing from the spirit of the invention and the scope of the appended claims, in which—

I claim:

1. The combination in an air conditioning apparatus of an upper tank adapted selectively for the reception of a liquid and a cooling medium, an air channel of highly conductive material disposed through said tank, the walls thereof being cooled by said cooling medium, an absorbent wick adapted in the humidifying function of the device to be partially immersed in said tank and trained over the edge thereof and in the dehumidifying function of the device to be placed out of contact with the fluid in said tank, said wick being disposed across said air channel, means for impelling air through said channel and said wick to cause moisture to be absorbed from said screen in the humidifying function of the device and to cause the air to be cooled in the air channel and moisture therefrom to be deposited upon said wick in the dehumidifying function of the device, and a lower tank disposed below said wick to receive the drip from the wick.

2. The combination in an air conditioning apparatus for living rooms, of a portable cabinet having handles for carrying from place to place and a discharge opening, an upper tank within the cabinet for holding a supply of liquid and a lower tank, an air channel disposed between said tanks to confine the flow of air, a loose cloth wick trained over the edge of said upper tank and hanging loosely over said discharge opening with one end thereof disposed above said lower tank to conduct liquid from the upper tank by capillarity for saturating the wick, said end of the wick being spaced from the surface of the liquid in said lower tank whereby to cause the excess liquid on the wick to drop from the latter into the tank, and means for impelling air through said discharge opening to urge the wick against the discharge opening whereby to confine the flow of air through the wick.

3. The combination in a portable window ventilator of a frame shaped for positioning in a partially open window for cooperation therewith to form a closure, said frame having a central opening for the passage of air, spaced screens interposed across said opening, a tank for holding a supply of liquid, a wick of greater width than said opening hanging between said screens and parallel therewith, the upper end of said wick being immersed in said liquid, an element above the level of said liquid over which said wick is trained to cause the liquid to pass thereover by capillarity, means for passing air through said opening and said wick from exterior to interior, the wick being arranged to carry a flow of water in excess of that lost by evaporation, whereby to continuously wash said wick, and means for disposing of the excess of liquid dripping from the bottom of said wick.

4. The combination in a portable air conditioning apparatus movable from room to room comprising parallelly disposed walls shaped to form a thin rectangular chamber, one face thereof having an air discharge opening and the other face having an air inlet opening, said openings being in registration, a foraminous screen disposed across said discharge opening, an air channel in registration with said air inlet opening positioned against said wall to confine the flow of air through said opening, a tank of relatively large capacity positioned above said channel, a loose cloth wick trained over the edge of said tank and hanging loosely in said chamber to conduct liquid from said tank by capillarity for saturating the wick, the lower end of said wick being suspended for drippage of liquid therefrom, the walls of said chamber confining the movement of said wick under the influence of air passing through said openings, and means for impelling air through said channel and the openings in said chamber to filter and humidify the air.

5. The combination in a portable air conditioning device adapted to be moved from room to room, of a cabinet having a front provided with a discharge opening and a back provided with an inlet opening, a tank disposed within the cabinet in spaced relation to the front and to the bottom thereof to provide re-circulation passages, an air channel for confining forward flow of air to the space between the tank and the front of said cabinet, the inlet end of said channel terminating in spaced relation to the back of said cabinet and communicating with the interior thereof, a lower tank in spaced relation to the bottom of said upper tank, a loose cloth wick trained over the edge of said upper tank and hanging in said space between the tank and said front and across said discharge opening with one end thereof disposed above said lower tank to conduct liquid from the upper tank by capillarity for saturating the wick, the end of the wick being spaced from the surface of the liquid in said lower tank whereby to cause the excess liquid on the wick to drip from the latter into the tank, and means for impelling air through said air channel whereby to move a part of the air through said wick and simultaneously re-circulate a part of the air through said re-circulation passages to the inlet of said channel.

CARL W. PIERSON.